(12) United States Patent
Wang et al.

(10) Patent No.: US 9,122,327 B2
(45) Date of Patent: Sep. 1, 2015

(54) METHOD FOR SYNCING DIFFERENT TOUCHING SYSTEMS

(75) Inventors: Kuo-Hsing Wang, New Taipei (TW);
Pei-Chen Chin, New Taipei (TW);
Pin-Hsien Su, New Taipei (TW);
Wen-Chin Wu, New Taipei (TW);
Yi-Sheng Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 232 days.

(21) Appl. No.: 13/608,289

(22) Filed: Sep. 10, 2012

(65) Prior Publication Data

US 2013/0241846 A1 Sep. 19, 2013

(30) Foreign Application Priority Data

Mar. 19, 2012 (TW) .............................. 101109275 A

(51) Int. Cl.
*G06F 3/041* (2006.01)
*G06F 3/038* (2013.01)
*G06F 3/0354* (2013.01)

(52) U.S. Cl.
CPC ............... *G06F 3/041* (2013.01); *G06F 3/038* (2013.01); *G06F 3/03545* (2013.01); *G06F 3/0416* (2013.01); *G06F 3/0418* (2013.01); *G06F 2203/04106* (2013.01)

(58) Field of Classification Search
CPC ..... G06F 3/03545; G06F 3/038; G06F 3/041; G06F 3/0416; G06F 3/0418; G06F 2203/0331; G06F 2203/0381; G06F 2203/0382; G06F 2203/04106; G06F 7/032

USPC ........... 345/20, 157, 173–176, 179–181, 213; 178/18.04, 19.01–19.05
See application file for complete search history.

(56) References Cited

U.S. PATENT DOCUMENTS

| | | | |
|---|---|---|---|
| 5,936,207 A * | 8/1999 | Kobayashi et al. ........ 178/18.01 |
| 7,085,400 B1 * | 8/2006 | Holsing et al. ................ 382/103 |
| 2002/0060665 A1 * | 5/2002 | Sekiguchi et al. ............ 345/157 |
| 2003/0142081 A1 * | 7/2003 | Iizuka et al. .................. 345/173 |
| 2008/0142280 A1 * | 6/2008 | Yamamoto et al. ........ 178/18.02 |
| 2009/0289906 A1 | 11/2009 | Hung |
| 2011/0234540 A1 * | 9/2011 | Liou et al. ..................... 345/175 |
| 2011/0304577 A1 * | 12/2011 | Brown et al. ................. 345/174 |
| 2012/0068964 A1 * | 3/2012 | Wright et al. ................. 345/174 |
| 2012/0235921 A1 * | 9/2012 | Laubach ....................... 345/172 |

* cited by examiner

*Primary Examiner* — Dwayne Bost
*Assistant Examiner* — Stefan M Oehrlein
(74) *Attorney, Agent, or Firm* — Muncy, Geissler, Olds & Lowe, P.C.

(57) ABSTRACT

A method for syncing different touching systems uses a computer, which is electrically connected with a first input device and a second input device respectively and in which an input of the first input device is controlled by the second input device, to make the first input device and the second device synchronous. The method includes defining at least one correction point on the first input device; receiving time tags of signal inputs at the correction points of the first input device and the second input device respectively; calculating time differences for each time tag at each correction point with respect to other correction points; averaging all time differences for all correction points to determine a deviation value; and delaying a signal transmission of the second input device according to the deviation value.

8 Claims, 4 Drawing Sheets

METHOD FOR SYNCING DIFFERENT TOUCHING SYSTEMS

BACKGROUND OF THE INVENTION

1. Field of the Invention The present invention relates to a method for syncing different touch systems.

2. Description of the Related Art

The rapid development of electronic devices is further enhanced with touch systems. When each electronic device comprises a touch system having its own response time and processing speed, users are concerned about the linking and synchronizing between different electronic devices.

For example, when a user is using both a touch device and a digital pen for inputting data to a computer at the same time, since the touch device and the digital pen have their own touch systems respectively and are not synchronized, the data transmitted by the touch device and the data transmitted by the digital pen are not received by the computer at the same time due to different response time or processing speed.

Furthermore, the digital pen can comprises a pressure sensing device for providing an additional Z coordinate data other than the X-Y coordinate data provided by the touch device; for example, when the digital pen is pressed with different stresses, it can generate different lines with different thicknesses.

Please refer to FIG. 1A to FIG. 1C, in general, when the touch device does not equip with a pressure sensing device, it can only generate a normal line on the display of the computer, as shown in FIG. 1A. When the touch device is equipped with a digital pen having a pressure sensing function, as shown in FIG. 1B, when the user draws a line from left to right with increasing strength, the touch device can provides a position (X-Y coordinate) of the line, while the digital pen can provide the thickness (Z coordinate) of the line. However, when the touch device and the digital pen are not synchronized, as shown in FIG. 1C, as the user increases his/her strength in drawing the line from left to right, the line shown on the figure is not exactly what the user expects since the line would grow thicker after the line passes a designated position, due to the slower processing speed of the digital pen.

SUMMARY OF THE INVENTION

It is an object of the present invention to provide a method for syncing different touch systems.

In order to achieve the above object, the present invention provides a method using a computer to sync two different touch systems, wherein the computer is electrically connected with a first input device and a second input device respectively, and the second input device controls an input of the first input device, the computer comprises a storage device for storing a software program and a processor for executing the software program to achieve the following steps:

defining at least one correction point on the first input device;

receiving a first time tag, when the second input device controls the input of a first correction point of the first input device, the first time tag is the time when a first input signal is received from the first correction point;

receiving a second time tag, when the second input device controls the input of the first correction point of the first input device, the second time tag is the time when a second input signal is received from the second input device;

calculating a first time difference between the first time tag and the second time tag to determine a deviation value; and delaying a signal transmission of the second input device according to the deviation value.

The method of the present invention further comprises:

receiving a third time tag, when the second input device controls the input of a second correction point of the first input device, the third time tag is the time when a third input signal is received from the second correction point;

receiving a fourth time tag, when the second input device controls the input of the second correction point of the first input device, the fourth time tag is the time when a fourth input signal is received from the second input device;

calculating a second time difference between the third time tag and the fourth time tag; and modifying the deviation value to be an average of the first and second time difference.

In this embodiment, in order to enhance the reliability of the deviation value (or average value), that is, to decrease the timing difference between the signal transmissions from the input of the first input device and the input of the second input device, other correction points can be added to modify the deviation value to an average of a plurality of time differences.

Besides, when a time difference is too large, a predetermined value can be used to determine whether the time difference is reasonable; therefore, the present invention further comprises:

determining whether the first time difference is larger than a predetermined value; and if yes, then proceeding a step of correction for a third correction point.

That is, when one of the time differences is too large, then the method skips that correction point and chooses another correction point to find a new average of the time differences. Preferably, the predetermined value is set between 0.05 to 3 seconds.

Furthermore, in addition to using the average as the deviation value for delaying the signal transmission of the second input device, the present invention can further determine whether a predetermined accumulated point is reached to proceed the correction steps, the present invention further comprises:

calculating a number of the inputs of the first input device controlled by the second input device to determine whether a predetermined accumulated points is reached;

if yes, then receiving a fifth time tag, when the second input device controls the input of the predetermined accumulated point of the first input device, the fifth time tag is the time when a fifth input signal is received from the predetermined accumulated point;

receiving a sixth time tag, when the second input device controls the input of the predetermined accumulated point of the first input device, the sixth time tag is the time when a sixth input signal is received from the second input device;

calculating a third time difference between the fifth time tag and the sixth time tag; and determining whether the third time difference is larger than the deviation value.

The predetermined accumulated point is set to be between the $100^{th}$ correction point to the $1000^{th}$ correction point. Preferably, the predetermined accumulated point is the $500^{th}$ correction point.

if the third time difference is larger than the deviation value, then proceeding the step of correction for the fourth correction point.

DETAILED DESCRIPTION OF THE PREFERRED EMBODIMENT

The advantages and innovative features of the invention will become more apparent from the following detailed description when taken in conjunction with the accompanying drawings.

Figure 2A:
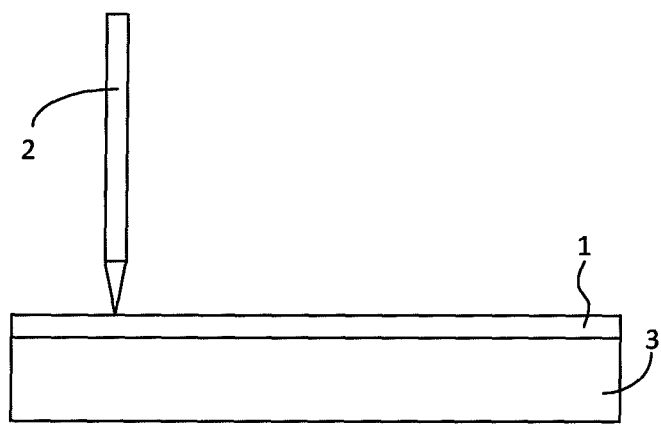
FIG. 2A illustrates a view of an embodiment of the computer, the first input device, and the second input device of the present invention.
Figure 2B:
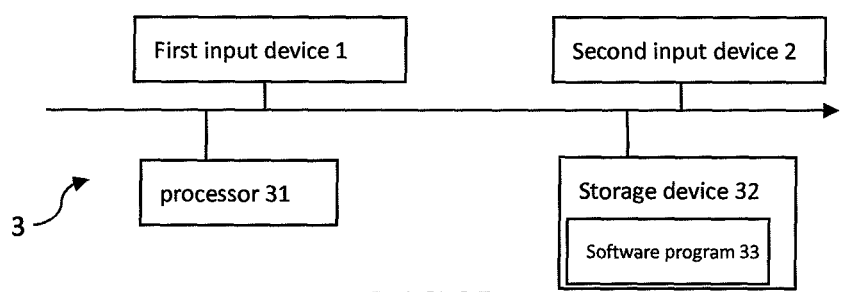
FIG. 2B illustrates a block diagram of the computer, the first input device, and the second input device of the present invention.

Please refer to FIG. 2A and FIG. 2B. The present invention provides a method using a computer 3 for syncing different touch systems, wherein the computer 3 is electrically connected with a first input device 1 and a second input device 2 respectively. The computer 3 comprises a processor 31 and a storage device 32 for storing a software program 33. The first input device 1 and the second input device 2 each has its own touch system. The processor 31 of the computer 3 executes the software program 33 to sync the first input device 1 and the second input device 2.

Figure 1A:
FIG. 1A illustrates a drawing view of display from a first input device of the present invention.
Figure 1B:
FIG. 1B illustrates an ideal result of the drawing of the first input device working with the second input device.
Figure 1C:
FIG. 1C illustrates a possible result of the drawing of the traditional first input device working with the traditional second input device.

The second input device 2 controls the input of the first input device 1. For example, the first input device 1 is a touch device, and the second input device 2 is a digital pen comprising a pressure sensing device, the touch device (with a display function) can display its own input and the pressed input of the digital pen on, such as those shown in FIG. 1B and FIG. 1C. As described above, the processor 31 executes the software program 33 to sync different touch system (such as the touch device and the digital pen in this example), which will be described in details below.

Figure 2C:
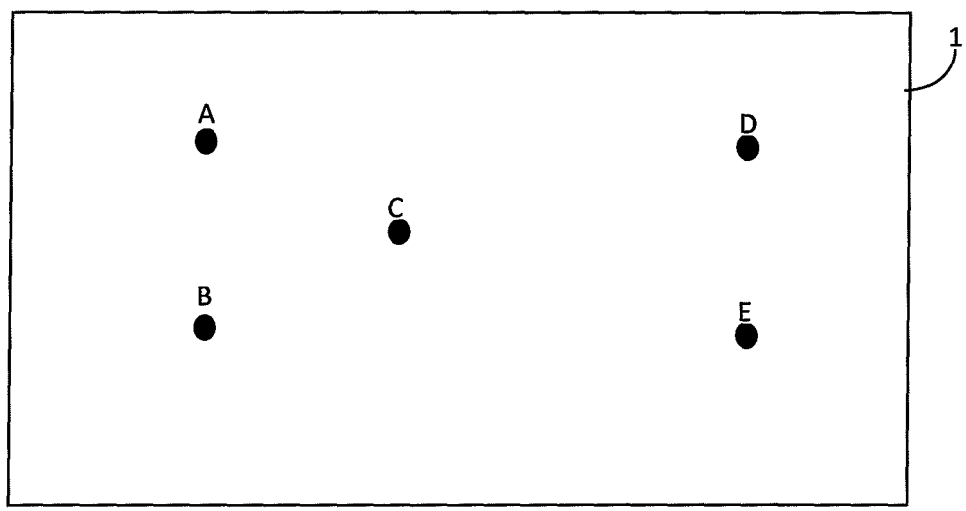
FIG. 2C illustrates a view of the first input device of the present invention.
Figure 3:
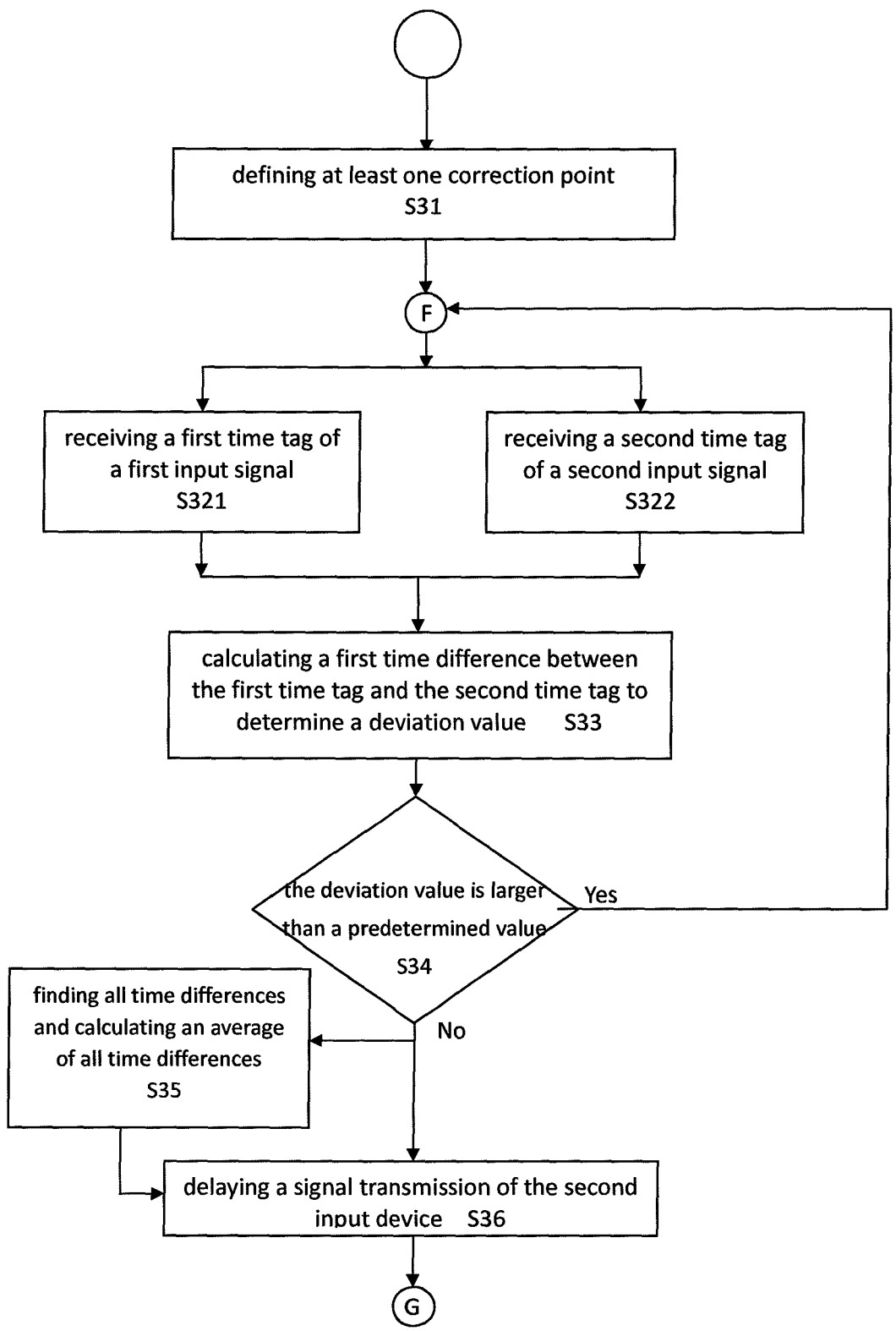
FIG. 3 illustrates a flowchart of the method of the present invention.

Please refer to the flowchart of FIG. 3, the method begins at the step S31: defining at least one correction point. In this embodiment, there are five correction points, which are shown as correction points A, B, C, D, and E in FIG. 2C.

In step S31, it defines a correction point on the first input device. Please refer to FIG. 2C, a correction point A is defined on the first input device 1. Then the method goes to steps S321 and S322: when the second input device 2 controls the input of the correction point A of the first input device 1, that is, the second input device 2 is on the correction point A, the computer 1 receives a first input signal and its input time (first time tag) from the first input device 1, and the computer 1 also receives a second input signal and its input time (second time tag) from the second input device 2.

Then the method goes to the step S33: calculating a first time difference between the first time tag and the second time tag to determine a deviation value.

In order to achieve an acceptable correction result, the present invention can also determine whether the deviation value is reasonable; therefore, the present invention further comprises the step S34: determining whether the deviation value is larger than a predetermined value. Preferably, the predetermined value is set between 0.05 to 3 seconds.

If the deviation value is within the range of the predetermined value, then the method goes to the step S36: delaying a signal transmission of the second input device 2 according to the deviation value. In this embodiment, there is only one correction point A, and the first time difference between the first time tag and the second time tag is within the range of the predetermined value; therefore the deviation value is set to be the first time difference for syncing the first and second input devices.

In a preferred embodiment, other correction points are included for correction; and the method goes to the step S35: finding all time differences for all correction points and calculating an average of all time differences. The deviation value used for delaying the signal transmission of the second input device 2 is set to be the average of all time differences. For example, please refer to FIG. 2A to FIG. 2C, when the second input device 2 controls the input of the first input device 1, the computer 1 receives input signals from the five correction points A to E, which comprises time tags of the first input device 1 and corresponding time tags of the second input device 2. The details are described below.

In this example, the length unit is centimeter, the time unit is second.

For example, suppose the first input device 1 is a touch device, an origin is set at the lower left corner of the touch screen, the input data at a position can be represented as (X, Y; t), wherein X and Y are coordinate data on X and Y axes (centimeter), t is the time data (time zone: UTC+08:00, Taipei Time); the second input device 2 is a digital pen having a pressure sensing device, the pressure value is represented by the diameter of the input, which is shown as the thickness of the line under different stress, the input data of second input device 2 can be represented as (Z; t), wherein Z is coordinate data on Z axis (centimeter), t is the time data (time zone: UTC+08:00, Taipei Time). The input signals of the five correction points A to E are illustrated below.

For example, at the first correction point A, the input data of the first input device 1 such as the X-Y coordinate data and the time is (10,10; 14:30:32.1900), the input data of the second input device 2 such as the Z coordinate data and the time is (2.8; 14:30:32.3600) respectively; then the time difference between the first and the second input device at the first correction point A is 0.17. For the second correction point B, the input data of the first input device 1 such as the X-Y coordinate data and the time is (790,10; 14:30:35.2000), the input data of the second input device 2 such as the Z coordinate data and the time is (3.0; 14:30:35.3600) respectively; then the time difference between the first and the second input device at the second correction point B is 0.16. For the third correction point C, the input data of the first input device 1 such as the X-Y coordinate data and the time is (400,300; 14:33:03.3100), the input data of the second input device 2 such as the Z coordinate data and the time is (2.0; 14:33:03.4900) respectively; then the time difference between the first and the second input device at the third correction point C is 0.18. For the fourth correction point D, the input data of the first input device 1 such as the X-Y coordinate data and the time is (10,590; 14:34:15.1100), the input data of the second input device 2 such as the Z coordinate data and the time is (3.0; 14:34:15.2200) respectively; then the time difference between the first and the second input device at the fourth correction point D is 0.11. For the fifth correction point E, the input data of the first input device 1 such as the X-Y coordinate data and the time is (10,590; 14:34:15.1300), the input data of the second input device 2 such as the Z coordinate data and the time is (3.5; 14:34:15.2200) respectively; then the time difference between the first and the second input device at the fourth correction point D is 0.09.

In this example, the time differences at each of the five correction points (not limited to five correction points) is 0.17, 0.16, 0.18, 0.11, and 0.09. The average is 0.142. Therefore, the deviation value can be set to be 0.142 for delaying the signal transmission of the second input device 2 and syncing the displayed output of the first input device 1 and the second input device 2, such as that shown in FIG. 1B.

In the determining process of step S34, if the time difference is larger than the predetermined value (which is determined to be "Yes"), then the method goes to the correction step of the next correction point. In other words, when the time difference is too large, it will not be counted in the averaging step; while time difference(s) from other correction point(s) can be used for calculating the average.

Figure 4:
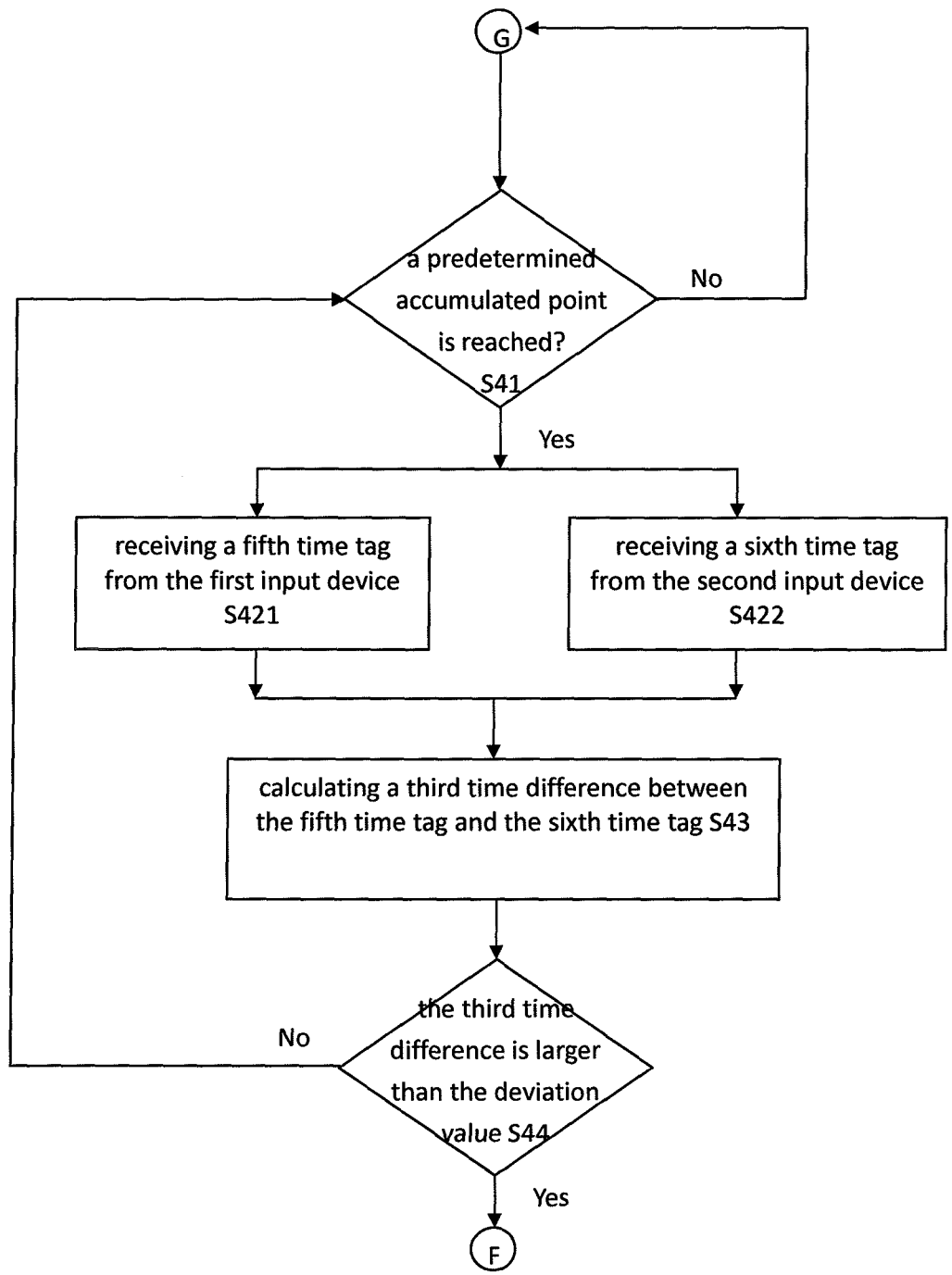
FIG. 4 illustrates another flowchart of the method of the present invention.

In addition to using the average as the deviation value for delaying the signal transmission of the second input device 2, the present invention can determine whether a predetermined accumulated point is reached for further correction. Please refer to FIG. 4, the present invention comprises:

Step S41: calculating a number of the inputs of the first input device controlled by the second input device to determine whether a predetermined accumulated point is reached. The predetermined accumulated point is set to be between the $100^{th}$ correction point to the $1000^{th}$ correction point. Preferably, the predetermined accumulated point is the $500^{th}$ correction point.

Then the method goes to step S421: if yes, then receiving a fifth time tag, when the second input device controls the input of the predetermined accumulated point of the first input device, the fifth time tag is the time when a fifth input signal is received from the predetermined accumulated point. Step S422: receiving a sixth time tag, when the second input device controls the input of the predetermined accumulated point of the first input device, the sixth time tag is the time when a sixth input signal is received from the second input device. Step S43: calculating a third time difference between the fifth time tag and the sixth time tag.

In short, when the second input device 2 controls the input of the first input device 1 reaching the predetermined accumulated point, the steps S421, S422 and S43 are performed again to calculate the time difference between the second input device 2 and the first input device 1.

Then the method goes to step S44: determining whether the third time difference is larger than the deviation value. If it is determined that the third time difference is not larger than the deviation value, then the method returns to step S41 and continues to accumulate the counting. If it is determined to be "Yes", then the method returns to the F point in FIG. 3 to repeat all steps again.

In the above embodiment, two input devices are used for illustrating the present invention; however, more than two input devices can be used in the present invention. As long as the correction point (such as the correction point of the first input device) of one of the input devices (such as the touch device) is known, then a plurality of unknown input devices can be synchronized by using the method of the present invention. Therefore, the embodiments and figures are only provided for describing the present invention and not for limiting the scope the present invention.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A method using a computer to sync two different touch systems, wherein the computer is electrically connected with a first input device and a second input device respectively, the second input device controls an input of the first input device, the computer comprises a storage device for storing a software program and a processor for executing the software program to achieve the following steps:

defining at least one correction point on the first input device; receiving a first time tag from the first input device, when the second input device controls the input of a first correction point of the first input device, the first time tag is the time when a first input signal is received from the first correction point, wherein the first correction point is one of the at least one correction point;

receiving a second time tag, when the second input device controls the input of the first correction point of the first input device, the second time tag is the time when a second input signal is received from the second input device;

calculating a first time difference between the first time tag and the second time tag to determine a deviation value;

delaying a signal transmission of the second input device according to the deviation value;

calculating a number of the inputs of the first input device controlled by the second input device to determine whether a predetermined accumulated point is reached for syncing the first input device and the second input device;

if the predetermined accumulated point is reached, then receiving a fifth time tag, when the second input device controls the input of the predetermined accumulated point of the first input device, the fifth time tag is the time when a fifth input signal is received from the predetermined accumulated point;

receiving a sixth time tag, when the second input device controls the input of the predetermined accumulated point of the first input device, the sixth time tag is the time when a sixth input signal is received from the second input device;

calculating a third time difference between the fifth time tag and the sixth time tag;

determining whether the third time difference is larger than the deviation value;

if the third time difference is larger than the deviation value, then repeating the correction steps for the at least one correction point.

2. The method as claimed in claim 1 further comprising:
determining whether the deviation value is larger than a predetermined value.

3. The method as claimed in claim 1 further comprising:
receiving a third time tag, when the second input device controls the input of a second correction points of the first input device, the third time tag is the time when a third input signal is received from the second correction point, wherein the second correction point is one of the at least one correction points;

receiving a fourth time tag, when the second input device controls the input of the second correction point of the first input device, the fourth time tag is the time when a fourth input signal is received from the second input device;

calculating a second time difference between the third time tag and the fourth time tag; and modifying the deviation value to be an average of the first and second time difference.

4. The method as claimed in claim 3 further comprising:
determining whether the average is larger than a predetermined value; and
if the average is larger than the predetermined value, then performing the correction steps to a third correction point, wherein the third correction point is one of the at least one correction points.

5. The method as claimed in claim 4, wherein the predetermined value is set between 0.05 to 3 seconds.

6. The method as claimed in claim 1, wherein the predetermined accumulated point is set to be between the 100th correction point to the 1000th correction point.

7. The method as claimed in claim 6, wherein the predetermined accumulated point is the 500th correction point.

8. A method using a computer to sync two different touch systems, wherein the computer is electrically connected with a first input device and a second input device respectively, the second input device controls an input of the first input device, the computer comprises a storage device for storing a software program and a processor for executing the software program to achieve the following steps:

defining a plurality of correction points on the first input device;

receiving a first set of time tags of the plurality of correction points of the first input device from the first input device and a second set of time tags of the second input device respectively, wherein the first set of time tags are the times when input signals are received from the plurality of correction points and the second set of time tags are the times when input signals are received from the second input device, wherein each one of the first set of time tags corresponds to each one of the second set of time tags; calculating an average of all time differences between the first set of time tags and the second set of time tags to determine a deviation value, wherein each time difference is calculated by comparing each one of the first set of time tags with a corresponding one of the second set of time tags;

delaying a signal transmission of the second input device according to the deviation value;

calculating a number of the inputs of the first input device controlled by the second input device to determine whether a predetermined accumulated point is reached for syncing the first input device and the second input device;

if the predetermined accumulated point is reached, then receiving a fifth time tag, when the second input device controls the input of the predetermined accumulated point of the first input device, the fifth time tag is the time when a fifth input signal is received from the predetermined accumulated point;

receiving a sixth time tag, when the second input device controls the input of the predetermined accumulated point of the first input device, the sixth time tag is the time when a sixth input signal is received from the second input device;

calculating a third time difference between the fifth time tag and the sixth time tag;

determining whether the third time difference is larger than the deviation value;

if the third time difference is larger than the deviation value, then repeating the correction steps for the at least one correction point.

* * * * *